(12) United States Patent
Prasanna et al.

(10) Patent No.: US 10,133,801 B2
(45) Date of Patent: Nov. 20, 2018

(54) PROVIDING DATA AGGREGATED FROM VARIOUS SOURCES TO A CLIENT APPLICATION

(71) Applicant: Tact.ai Technologies, Inc., Redwood City, CA (US)

(72) Inventors: Dhananjay Prasanna, San Francisco, CA (US); Premnath Parameswaran, Sunnyvale, CA (US); Kurtis L. Seebaldt, San Francisco, CA (US); Kevin Lynn Smith, San Francisco, CA (US)

(73) Assignee: TACT.AI TECHNOLOGIES, INC., Redwood City, CA (US)

( * ) Notice: Subject to any disclaimer, the term of this patent is extended or adjusted under 35 U.S.C. 154(b) by 383 days.

(21) Appl. No.: 14/209,872

(22) Filed: Mar. 13, 2014

(65) Prior Publication Data

US 2014/0279910 A1    Sep. 18, 2014

Related U.S. Application Data

(60) Provisional application No. 61/789,277, filed on Mar. 15, 2013.

(51) Int. Cl.
*G06F 17/30* (2006.01)

(52) U.S. Cl.
CPC ............... *G06F 17/30569* (2013.01)

(58) Field of Classification Search
CPC ......... G06F 17/30067; G06F 17/30489; G06F 11/1458; G06F 11/3072
USPC ............. 707/639, 718, 674, 654, 640, 812
See application file for complete search history.

(56) References Cited

U.S. PATENT DOCUMENTS

| | | | | |
|---|---|---|---|---|
| 7,890,689 B2* | 2/2011 | Lam | .................... | G06F 9/44505 711/118 |
| 8,615,493 B2* | 12/2013 | Prahlad | ............... | G06F 11/1458 707/640 |
| 2001/0056461 A1* | 12/2001 | Kampe | ............... | H04L 12/2602 709/201 |
| 2006/0259621 A1* | 11/2006 | Ranganathan | .......... | G06F 1/206 709/226 |
| 2007/0240165 A1* | 10/2007 | Carey | ................. | H04L 41/0233 719/310 |
| 2008/0016148 A1* | 1/2008 | Lora | ....................... | G06Q 10/00 709/203 |
| 2008/0215796 A1* | 9/2008 | Lam | .................... | G06F 9/44505 711/100 |
| 2010/0332453 A1* | 12/2010 | Prahlad | ............... | G06F 11/1458 707/640 |
| 2010/0332561 A1* | 12/2010 | Prahlad | ............... | G06F 11/1458 707/812 |

(Continued)

*Primary Examiner* — Jean M Corrielus
(74) *Attorney, Agent, or Firm* — Fenwick & West LLP (57) ABSTRACT

A system and a method are disclosed for generating a repository to be used on a client device. The repository is generated based on a repository format supported by the client device, which is identified by analyzing an empty repository created by the client device. The generated repository is configured with metadata that allows an operating system executing on the client device to communicate with the repository. Once generated, the repository is populated with data associated with a user of the client device. The populated repository is transmitted to the client device, where the repository is used by applications for retrieving and storing data.

20 Claims, 5 Drawing Sheets

(56) References Cited

U.S. PATENT DOCUMENTS

| | | | |
|---|---|---|---|
| 2010/0332990 A1* | 12/2010 | Prahlad | G06F 11/1458 715/735 |
| 2012/0021776 A1* | 1/2012 | Phillips | G06Q 30/0282 455/456.3 |
| 2012/0130987 A1* | 5/2012 | Bose | G06F 17/30489 707/718 |
| 2013/0006945 A1* | 1/2013 | Prahlad | G06F 11/1458 707/674 |
| 2013/0227352 A1* | 8/2013 | Kumarasamy | G06F 11/3072 714/47.1 |
| 2014/0129642 A1* | 5/2014 | Schneider | G06Q 10/06 709/205 |
| 2015/0199239 A1* | 7/2015 | Prahlad | G06F 11/1458 707/654 |

* cited by examiner

PROVIDING DATA AGGREGATED FROM VARIOUS SOURCES TO A CLIENT APPLICATION

CROSS REFERENCE TO RELATED APPLICATIONS

This application claims priority under 35 U.S.C. § 119(e) to U.S. Provisional Patent Application Ser. No. 61/789,277, filed Mar. 15, 2013 and entitled "Providing Data Aggregated from Various Source to a Client Application." The content of the U.S. Provisional Patent Application Ser. No. 61/789,277 is incorporated herein in its entirety.

BACKGROUND

Field of Art

The disclosure generally relates to the field of data management and specifically to providing data aggregated from various data sources to client applications.

Description of the Related Art

Users of data aggregation applications have vast amounts of pre-existing data stored on various sources. Presenting the data associated with a particular user in an aggregated manner requires transmitting all the data to a client device operated by the user. In typical cases, the size of the data associated with a particular user is over 50 MB, and the data must be transmitted to the client device over low bandwidth connections, such as a wireless connection or a 3G mobile network connection.

Traditional approaches for transmitting the data involve "trickle down" transmission, where the data is slowly transmitted to the client device in small units. Such approaches have many drawbacks including the large amount of time needed to transmit the data as well as the amount of power drained on the client device while the data is being received. Other drawbacks include keeping track of transmission interruptions and translating received data into a storage format supported by the client device.

Accordingly, there is a need for a system that enables the efficient transmission of large amounts of data to a client device.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A data processing engine executing on a server generates and populates client repositories to be used by a data presentation application executing on a client device. A client repository generated on the server operates as if the operating system executing on the client device generated the client repository.

One embodiment of a disclosed configuration is a system and method for generating a repository to be used on a client device. The system includes a server repository configured to store data received from a plurality of data sources. The system also includes a data processing engine configured to generate a client repository for a client device and populating the client repository with a subset of the data stored in the server repository. The data processing engine generates the client repository by determining a repository format supported by the client device and creating a repository according to the repository format. The data processing engine then populates the repository with a subset of the data stored in the server repository that is to be used by a client application executing on the client device. The populated repository is transmitted to the client device for access by the client application.

Another embodiment of a disclosed configuration is a method for generating a repository to be used on a client device. The repository is generated based on a repository format supported by the client device, which is identified by analyzing an empty repository created by the client device. The generated repository is configured with metadata that allows an operating system executing on the client device to communicate with the repository. Once generated, the repository is populated with data associated with a user of the client device. The populated repository is transmitted to the client device, where the repository is used by applications for retrieving and storing data.

Example Processing Overview

Figure 1:
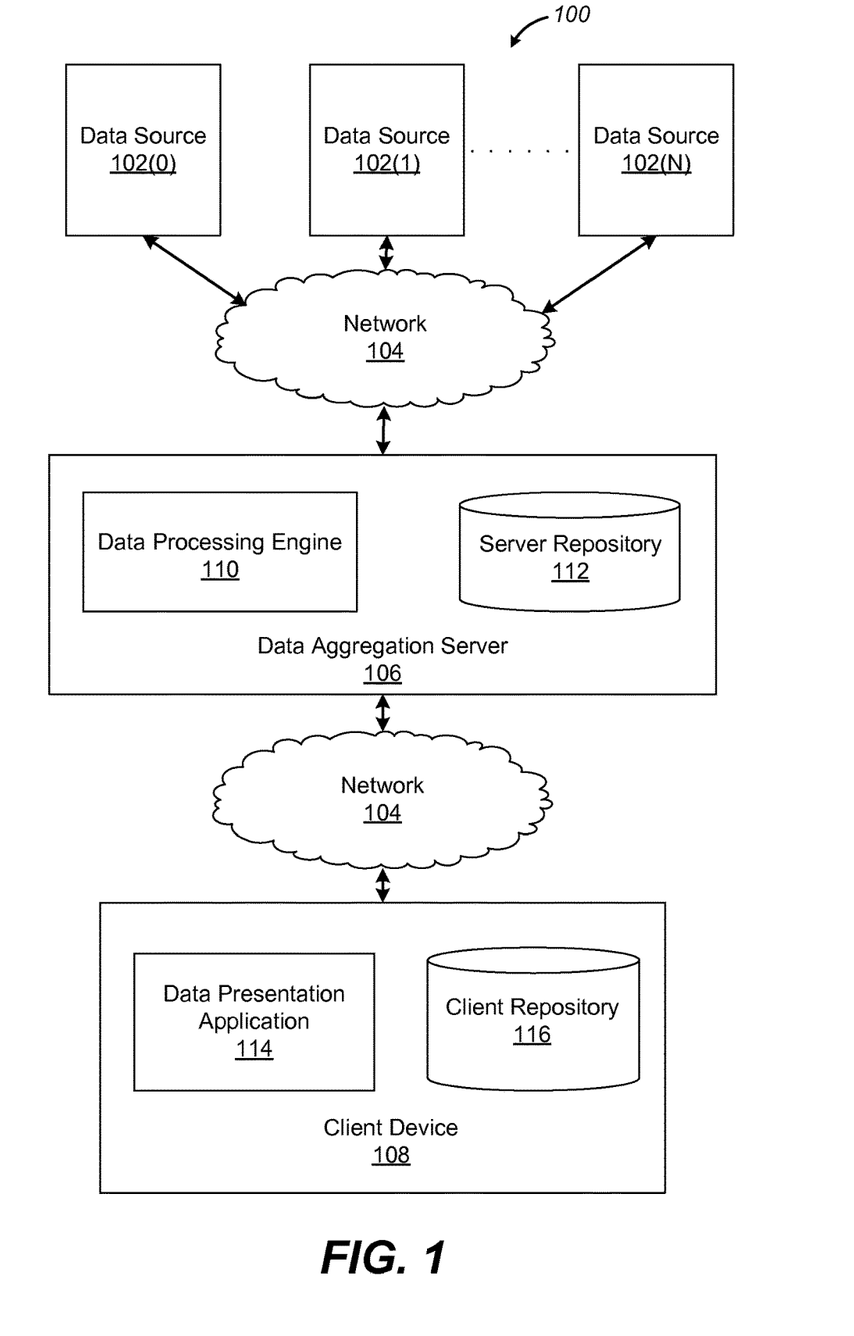
FIG. 1 illustrates one embodiment of a computing environment configured to aggregate data from several sources and provide the aggregated data to client applications.

FIG. 1 illustrates one embodiment of a computing environment 100 configured to aggregate data from several sources and provide the aggregated data to client applications. As shown, the computing environment 100 includes data sources 102, a data aggregation server 106 and a client device 108. The data sources 102, the aggregation server 106 and the client device 108 are communicatively coupled through a network 104. Although only one aggregation server 106 and client device 108 are illustrated, the computing environment 100 may include multiple instances of each entity. Moreover, some of the functions ascribed to the aggregation server 106 may be performed by the client device 108 and vice versa. Other entities may also be coupled to the network 104.

One or more data source 102(0) . . . 102(N) (generally 102) are a part of a system that manages and stores data associated with individuals or groups of individuals. For example, a data source 102 may be a contact management system, a customer relationship management (CRM) system or a human resource (HR) management system. Each data source 102 stores data according to a fixed database schema. For example, data source 102(0) may store a user's contact data according to a schema that stores a record per contact, each record being associated with one or more fixed fields. In one embodiment, data storage schemas across different data sources may vary significantly even when storing the same type of data. Each data source 102 provides a channel for accessing and updating data stored within the data source 102.

The data aggregation server 106 includes a data processing engine 110 and a server repository 112. The data processing engine 110 accesses data stored within the data sources 102 via the channels provided by each data source 102. The data processing engine 110 aggregates related data received from the different data sources 102 and organizes the aggregated data into flexible records. A flexible record is a composite of fields aggregated from a set of related records received from one or more data sources 102. Each field associated with a flexible record includes data received from a particular data source 102 and specifies the particular data source 102 as the source of the data. Flexible records are stored in the storage repository 112. Each flexible record stored in the storage repository 112 is associated with at least one user who accesses data via a client device, such as client device 108, communicating with the data aggregation server 106.

In operation, when a user creates an account with the data aggregation server 106, the user identifies one or more data sources 102 that store data associated with the user. In one embodiment, the aggregation server 106 automatically, without user intervention, identifies the data sources 102 that store data associated with the user based on the user's location, name, organization affiliation, etc. The data processing engine 110 retrieves from each identified data source one or more records storing data associated with the user. The records retrieved from different data sources may store related data but may be structured according to different schemas. The data processing engine 110 aggregates the records and stores the aggregated records as flexible records in the storage repository 112. In one embodiment, multiple users may be associated with the same data in one or more data sources 102. In such an embodiment, the data processing engine 110 does not generate multiple flexible records storing the same data but associates the multiple users with the same flexible record storing the data.

Data stored in the server repository 112 that is associated with a particular user is transmitted to the client device 108 operated by the user for presentation in the data presentation application 114. Data received from the server repository 112 is stored in the client repository 116. The data presentation application 114 retrieves data stored in the client repository 116 and allows users to view and interact with the data as well as modify the data if necessary. Any modifications made to the data are stored in the client repository 116 and also transmitted by the data presentation applications 114 to the data processing engine 110.

The data processing engine 110 tracks all modifications made via the data presentation application 114 to data that is also stored in the server repository 112. In one embodiment, the data processing engine 110 identifies a particular data field stored in the server repository 112 that was modified via the data presentation application 114. The data processing engine 110 transmits the modified data to the data source 102 specified in the data field. In such a manner, a data field that is modified on the client device 108 may be synchronized with the data field stored in the server repository 112 as well as the data source 102 from which the data associated with the data field was originally retrieved.

The network 104 represents the communication pathways between the bookshelf server 104, client device 112, and any other entities on the network. In one embodiment, the network 104 is the Internet and uses standard communications technologies and/or protocols. Thus, the network 104 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 104 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 104 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

Figure 2:
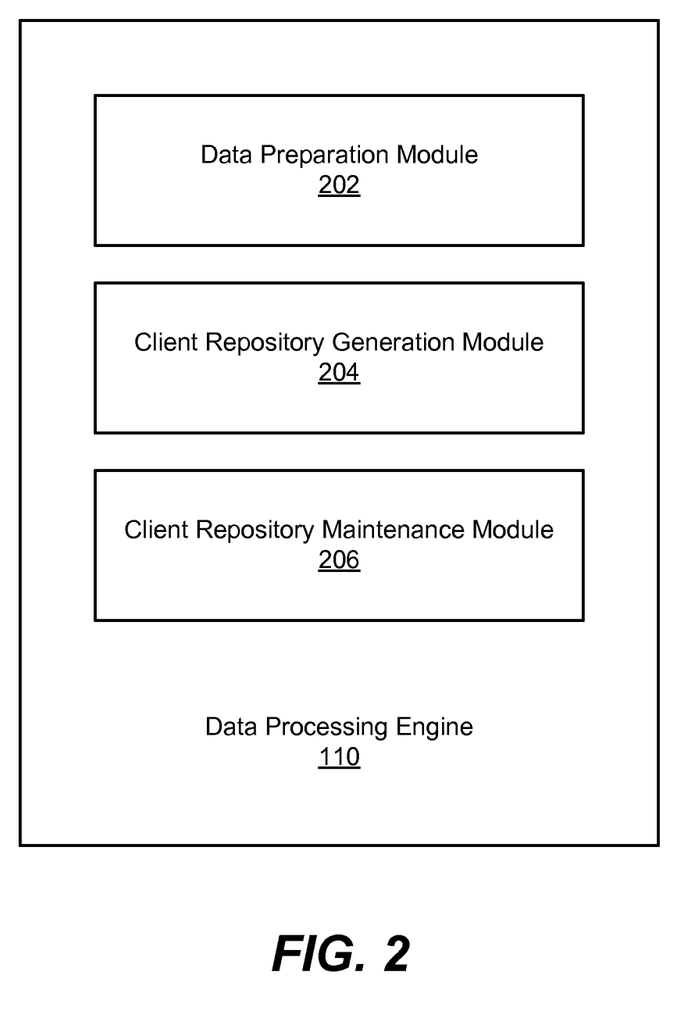
FIG. 2 illustrates an embodiment of the data processing engine of FIG. 1.

FIG. 2 illustrates an embodiment of the data processing engine 110 of FIG. 1. As shown, the data processing engine 110 includes a data preparation module 202, a client repository generation module 204 and a client repository maintenance module 206.

The data preparation module 202 receives data associated with a particular user from various data sources 102. The data preparation module 202 processes the data by performing various operations before the data is stored in the server repository 110. Data de-duplication is one operation performed on the data by the data preparation module 202 to remove duplicate data received from different data sources 102. For example, if two data sources 102 include contacts associated with the user, the contact data received from the two data sources 102 may include several duplicate contacts. In such a situation, the data preparation module 202 performs a de-duplication operation on the contact data to remove duplicate contacts.

The data preparation module 202 analyzes the processed data and aggregates data fields related to the same object. An object includes any data structure having multiple attributes, where the value of each attribute is specified in a different data field. Examples of objects include contacts, documents, calendar items, etc. For each object, the data preparation module 202 stores all the data fields related to the object in the server repository 110 as a flexible record.

In one embodiment, when performing the data de-duplication operation on the data, the data preparation module 202 assigns each data field in the data to a bucket based on a hash value associated with the bucket. Specifically, a data field having a hash value matching the hash value associated with a bucket is assigned to the bucket. The data preparation module 202 identifies multiple data fields assigned to the same bucket as duplicates.

When the data presentation application 114 is first installed on the client device 108, the client repository generation module 204 receives a request from the data presentation application 114 for data associated with a particular user. In response to such a request, the client repository generation module 204 determines the repository format supported by the operating system executing on the client device 108. Based on the repository format, the client repository generation module 204 generates a repository having a structure and metadata that would allow an operating system executing on the client device 108 to communicate with the generated repository. In one embodiment, the repository generated by the client repository generation module 204 is structurally the same as a repository generated by the operating system executing on the client device 108.

The client repository generation module 204 populates the generated repository with flexible records associated with the user of the client device 108. The client repository generation module 204 transmits the populated repository to the client device 108 and also maintains a copy of the populated repository in the server repository 112. The repository received from the client repository generation module 204 operates in the client device 108 as the client repository 116. The data presentation application 114 interacts with the client repository 116 to retrieve and modify data in the same manner as if the repository were generated by the operating system executing on the client device 108.

The client repository maintenance module 206 synchronizes the copy of the populated repository in the server repository 112 with client repository 116 as modifications are made to data stored in the client repository 116. In operation, the data presentation application 114 transmits any data modification made in the client repository 116 to the client repository maintenance module 206. The client repository maintenance module 206 updates the copy of the populated repository in the server repository 112 to reflect the modifications made in the client repository 116. In such a manner, the client repository 116 and the copy of the populated repository in the server repository 112 remain synchronized. Consequently, if the client repository 116 is corrupted or destroyed for any reason, then the copy of the populated repository in the server repository 112 may be transmitted to the client device 108 as a replacement client repository 116.

In one embodiment, the data processing engine 110 also generates search indexes that are to be used by the data presentation application 114. Like the repository, the generated search indices have a structure and metadata that would allow an operating system executing on the client device 108 to communicate with the search index as if the search index were created by the operating system.

Figure 3:
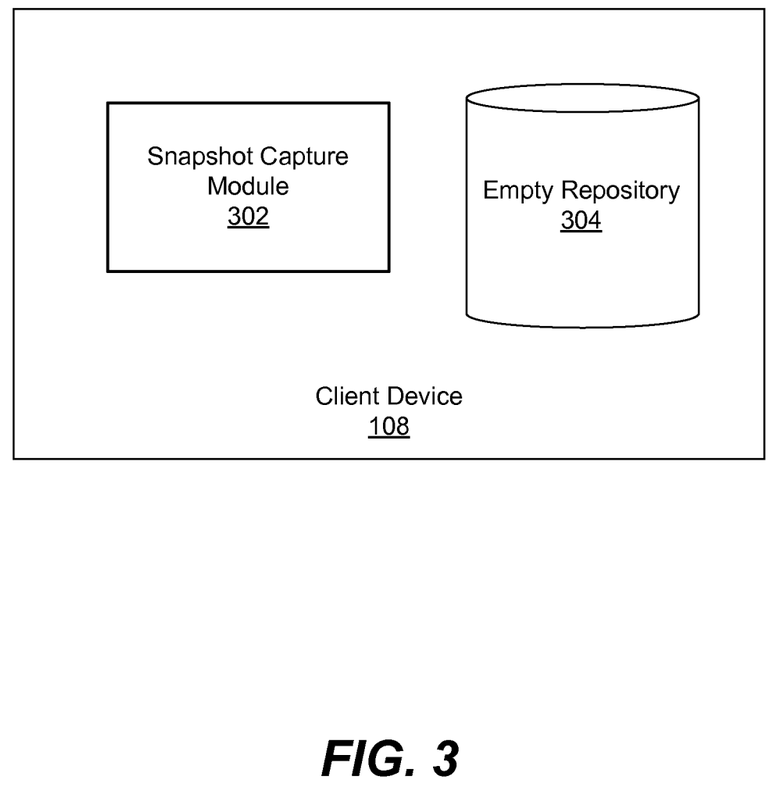
FIG. 3 illustrates an embodiment of a snapshot capturing module executing within the client device of FIG. 1.

FIG. 3 illustrates an embodiment of a snapshot capturing module 302 executing within the client device 108 of FIG. 1. The snapshot capturing module 302 causes the operating system executing on the client device 108 to create an empty repository 304. The snapshot capturing module 302 analyzes a snapshot of the empty repository 304 to identify the repository format supported by the operating system executing on the client device 108. The repository format specifies the internal structure of and any metadata stored in the empty repository 304 that enables the operating system to properly communicate with the empty repository 304. The snapshot module 302 transmits the identified repository format to the client repository generation module 204. The client repository generation module 204 uses the identified repository format to generate the client repository 116 as described above in conjunction with FIG. 2.

In one embodiment, the snapshot capturing module 302 executes on a different client device having the same configuration as client device 108 such that the repository format supported by the operating system executing on the different client device is also supported by the operating system executing on the client device 108.

Figure 4:
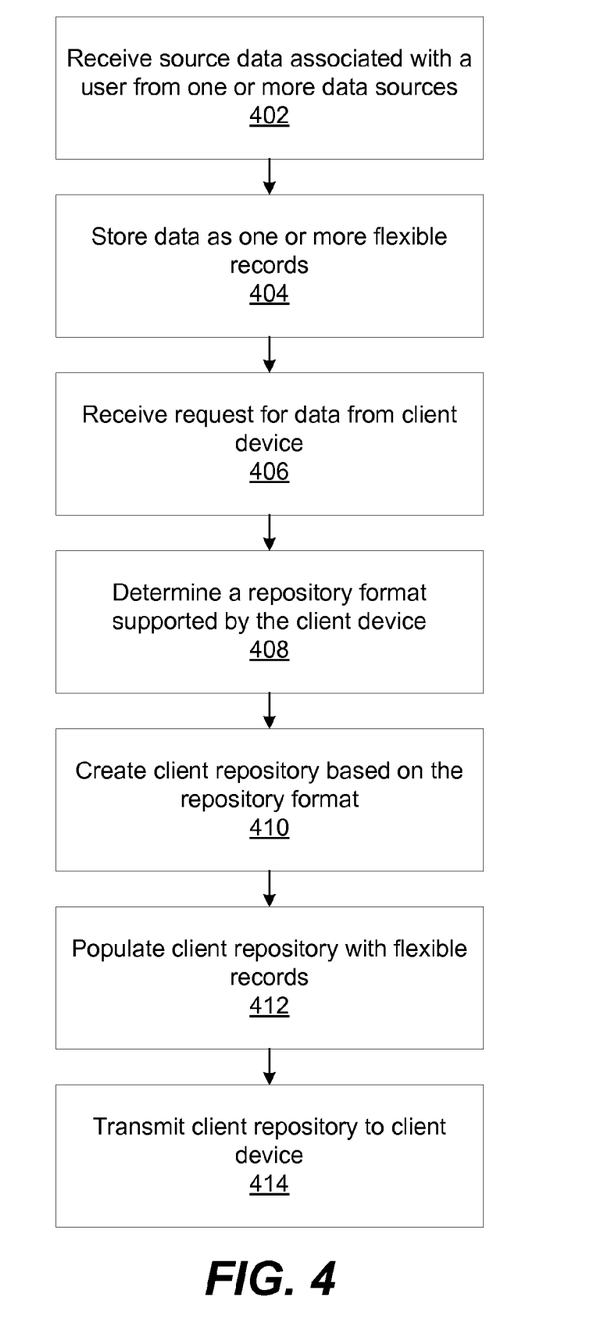
FIG. 4 illustrates an embodiment of a process for generating a client repository for transmission to a client device.

FIG. 4 illustrates an embodiment of a process for generating a client repository for transmission to a client device. At step 402, the data preparation module 202 receives data associated with a particular user from various data sources 102. At step 404, the data preparation module 202 stores data fields included in the data received from the data sources 102 as flexible records in the server repository 110. Data fields related to the same object are associated with the same flexible record.

At step 406, when the data presentation application 114 is first installed on the client device 108, the client repository generation module 204 receives a request for data associated with a particular user from the client device 108. At step 408, the client repository generation module 204 determines the repository format supported by the operating system executing on the client device 108. At step 410, based on the repository format, the client repository generation module 204 generates a repository having a structure and metadata that would allow an operating system executing on the client device 108 to communicate with the repository.

At step 412, the client repository generation module 204 populates the generated repository with flexible records associated with the user of the client device 108. At step 414, the client repository generation module 204 transmits the populated repository to the client device 108. In one embodiment, a copy of the populated repository is stored in the server repository 112. The client repository maintenance module 206 maintains the copy such that any modifications made on the client repository transmitted to the client device 108 are also made to the copy.

Computing Machine Architecture

Figure 5:
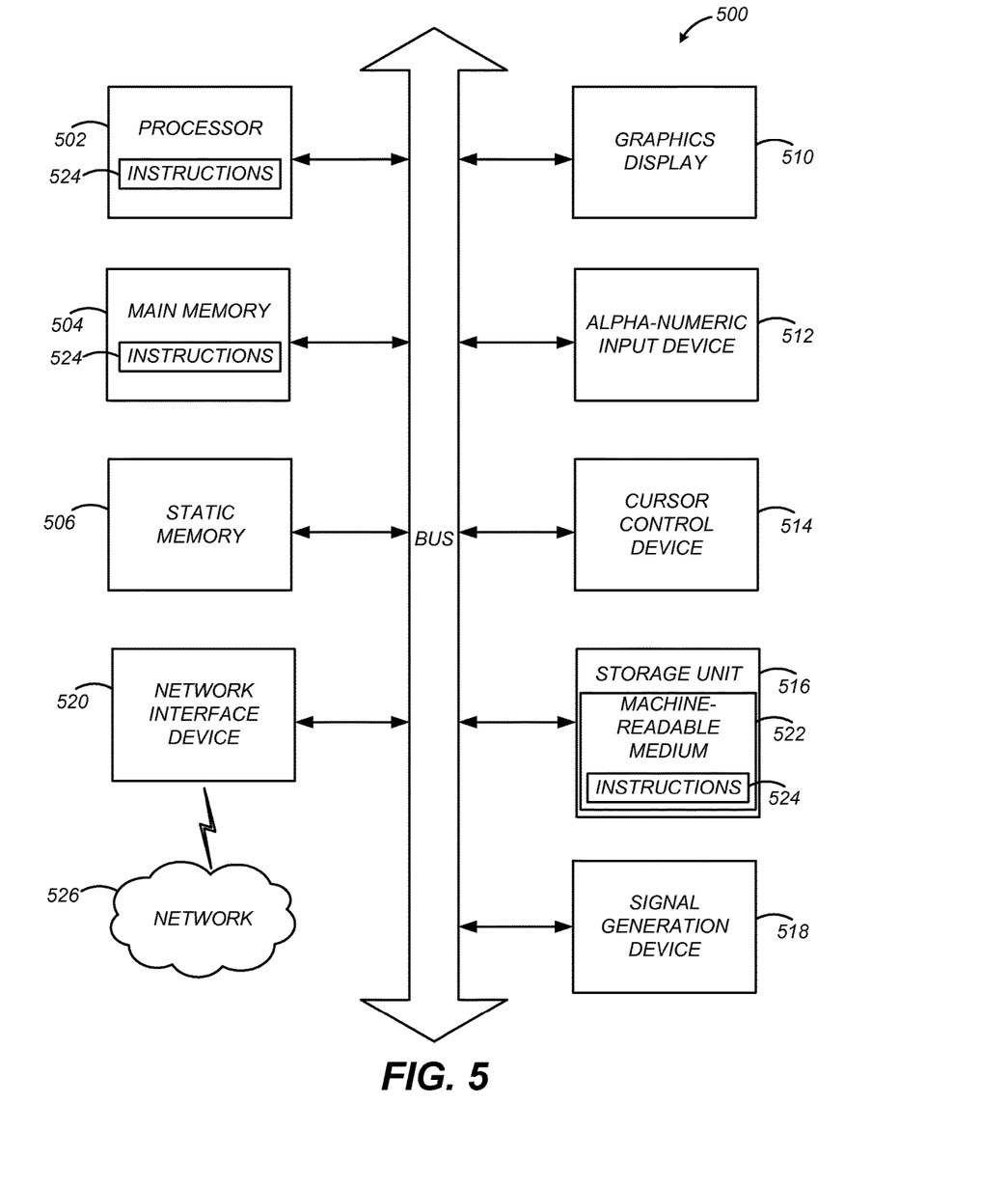
FIG. 5 illustrates one embodiment of components of an example machine able to read instructions from a machine-readable medium and execute them in a processor (or controller).

The disclosed software structures and processes described in FIGS. 1-4 are configured for operation on a machine, e.g., a computing system. FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which instructions 524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a mobile computing devices such as a tablet computer, an ultrabook (or netbook) computer, a personal digital assistant (PDA), a cellular telephone, a smartphone, a web appliance, or like machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processors 502 (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 500 also includes a main memory 504 and a static memory 506. The components of the computing system are configured to communicate with each other via a bus 508. The computer system 500 may further include graphics display unit 510 (e.g., a plasma display panel (PDP), a liquid crystal display (LCD)) which may be configured for capacitive or inductive touch sensitivity to allow for direct interaction with software user interfaces through the display 510. The computer system 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

An advantage of the configurations as disclosed is that the client-side repository is generated and populated server-side. When an application needing data is first installed on the client, the populated client-side repository is transmitted to the client in its entirety. Consequently, the data needed by the client is delivered in one transmission (as opposed to over the course of multiple transmissions), reducing both data transmission time and the amount of power consumed during the transmission of the data.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating a client repository on a server for transmission to a client device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a storage repository in a server system for use on a client device, the method comprising:
    receiving, from the client device at a data processing engine, a snapshot of an empty storage repository created by the client device;
    determining, by the data processing engine, a repository format supported by an operating system executing on the client device based on the snapshot of the empty storage repository, the repository format specifying an internal structure of the empty storage repository and metadata stored in the empty storage repository to enable the operating system to communicate with the empty storage repository;
    creating, by the data processing engine, a new storage repository according to the repository format supported by the client device, the new storage repository configured with an internal structure and metadata that allows the operating system executing on the client device to communicate with the new storage repository;
    populating, by the data processing engine, the new storage repository with a plurality of records stored in a server repository to be used by a client application of the client device, wherein the plurality of records is received from one or more data sources; and
    transmitting, by the data processing engine, the populated new storage repository to the client device for storage and for access by the client application.

2. The method of claim 1, further comprising, prior to transmitting the populated new storage repository, compressing the populated new storage repository to reduce the amount of time needed to transmit the populated repository to the client device.

3. The method of claim 1, wherein populating the new storage repository with a plurality of records comprises selecting records from a server repository that stores records received from a plurality of data sources.

4. The method of claim 1, further comprising:
    storing a copy of the new storage repository in a server-side repository;
    receiving additional data from the client application that was written to the new storage repository in the client device; and
    storing the additional data in the copy of the new storage repository.

5. The method of claim 1, further comprising:
    after transmitting the populated new storage repository, identifying additional data to be used by the client application; and
    transmitting the additional data to the client device for storing in the populated new storage repository.

6. The method of claim 1, wherein the new storage repository is populated with data to be used by a client application executing on the client device.

7. The method of claim 1, wherein the subset of data comprises contact data.

8. A non-transitory computer-readable storage medium for storing instructions that, when executed by a processor, cause the processor to generate a repository to be used on a client device, the instructions when executed cause the processor to:
- receive, from the client device at a data processing engine, a snapshot of an empty storage repository created by the client device;
- determine, by the data processing engine, a repository format supported by an operating system executing on the client device based on the snapshot of the empty storage repository, the repository format specifying an internal structure of the empty storage repository and metadata stored in the empty storage repository to enable the operating system to communicate with the empty storage repository;
- create, by the data processing engine, a new storage repository according to the repository format supported by the client device, the new storage repository configured with an internal structure and metadata that allows the operating system executing on the client device to communicate with the new storage repository;
- populate, by the data processing engine, the new storage repository with a plurality of records stored in a server repository to be used by a client application of the client device, wherein the plurality of records is received from one or more data sources; and
- transmit, by the data processing engine, the populated new storage repository to the client device for storage and for access by the client application.

9. The computer readable storage medium of claim 8, wherein the instructions further comprise instructions that when executed cause the processor to:
- store a copy of the new storage repository in a server-side repository;
- receive additional data from the client application that was written to the new storage repository in the client device; and
- store the additional data in the copy of the new storage repository.

10. The computer readable storage medium of claim 8, wherein the instructions further comprise instructions that when executed cause the processor to, prior to transmitting the populated new storage repository, compress the populated new storage repository to reduce the amount of time needed to transmit the populated new storage repository to the client device.

11. The computer readable storage medium of claim 8, wherein the instructions further comprise instructions that when executed cause the processor to:
- after transmitting the populated new storage repository, identify additional data to be used by the client application; and
- transmit the additional data to the client device for storing in the populated new storage repository.

12. The computer readable storage medium of claim 8, wherein the instruction to populate the new storage repository with data further comprise instructions that when executed cause the processor to select data from a server repository that stores data received from a plurality of data sources.

13. The computer readable storage medium of claim 8, wherein the new storage repository is populated with data to be used by a client application executing on the client device.

14. The computer readable storage medium of claim 8, wherein the subset of data comprises contact data.

15. A system for generating a repository to be used on a client device, the system comprising:
- a data processing engine configured to:
  - receive a snapshot of an empty storage repository created by the client device;
  - determine a repository format supported by an operating system executing on the client device based on the snapshot of the empty storage repository, the repository format specifying an internal structure of the empty storage repository and metadata stored in the empty storage repository to enable the operating system to communicate with the empty storage repository;
  - create a new storage repository according to the repository format supported by the client device, the new storage repository configured with an internal structure and metadata that allows the operating system executing on the client device to communicate with the new storage repository;
  - populate the new storage repository with a plurality of records stored in a server repository to be used by a client application of the client device, wherein the plurality of records is received from one or more data sources; and
  - transmit the populated new storage repository to the client device for storage and for access by the client application.

16. The system of claim 15, wherein the data processing engine is further configured to:
- store a copy of the new storage repository in a server-side repository;
- receive additional data from the client application that was written to the new storage repository in the client device; and
- store the additional data in the copy of the new storage repository.

17. The system of claim 15, wherein the data processing engine is further configured to, prior to transmitting the populated new storage repository, compress the populated new storage repository to reduce the amount of time needed to transmit the populated new storage repository to the client device.

18. The system of claim 15, wherein the data processing engine is further configured to:
- after transmitting the populated new storage repository, identify additional data to be used by the client application; and
- transmit the additional data to the client device for storing in the populated new storage repository.

19. The system of claim 15, wherein populating the new storage repository with data comprises selecting data from a server repository that stores data received from a plurality of data sources.

20. The system of claim 15, wherein the new storage repository is populated with data to be used by a client application executing on the client device.

* * * * *